United States Patent
Von Watzdorf et al.

(10) Patent No.: US 9,981,696 B2
(45) Date of Patent: May 29, 2018

(54) PILLAR FOR A MOTOR VEHICLE AND METHOD FOR MANUFACTURING A PILLAR

(71) Applicant: Benteler Automobiltechnik GmbH, Paderborn (DE)

(72) Inventors: Henning Von Watzdorf, Delbrueck (DE); Georg Frost, Steinheim (DE); Martin Schroeter, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days. days.

(21) Appl. No.: 15/662,607

(22) Filed: Jul. 28, 2017

(65) Prior Publication Data

US 2018/0029648 A1    Feb. 1, 2018

(30) Foreign Application Priority Data

Jul. 29, 2016  (DE) .......................... 10 2016 114 062

(51) Int. Cl.

| | |
|---|---|
| *B62D 25/04* | (2006.01) |
| *B62D 29/00* | (2006.01) |
| *B21J 5/12* | (2006.01) |
| *B21K 7/12* | (2006.01) |
| *B21K 29/00* | (2006.01) |
| *B62D 65/00* | (2006.01) |

(52) U.S. Cl.
CPC .............. *B62D 25/04* (2013.01); *B21J 5/12* (2013.01); *B21K 7/12* (2013.01); *B21K 29/00* (2013.01); *B62D 29/007* (2013.01); *B62D 65/00* (2013.01)

(58) Field of Classification Search
CPC .......... B62D 25/04; B62D 29/007; B21J 5/12; B21K 7/12; B21K 29/00
USPC ..................................................... 296/193.06
See application file for complete search history.

(56) References Cited

U.S. PATENT DOCUMENTS

| | | | |
|---|---|---|---|
| 6,474,726 B1* | 11/2002 | Hanakawa ............. | B62D 25/04 296/187.12 |
| 9,616,488 B2* | 4/2017 | Pellmann ................. | B21K 7/12 |
| 9,630,651 B1* | 4/2017 | Baccouche ........... | B62D 25/04 |
| 9,630,652 B2* | 4/2017 | Balur ..................... | B62D 25/04 |
| 9,828,034 B2* | 11/2017 | Cazes .................... | B62D 25/04 |
| 2002/0069506 A1 | 6/2002 | Brodt et al. | |
| 2002/0104591 A1 | 8/2002 | Gehringhoff et al. | |
| 2010/0194146 A1* | 8/2010 | Nishimura ........... | B62D 21/157 296/193.06 |
| 2014/0239672 A1* | 8/2014 | Yajima .................. | B62D 25/04 296/193.06 |
| 2015/0298199 A1* | 10/2015 | Pellmann ................. | C21D 1/52 148/531 |

(Continued)

FOREIGN PATENT DOCUMENTS

| | | |
|---|---|---|
| DE | 10049660 A1 | 4/2002 |
| EP | 1180470 A1 | 2/2002 |

*Primary Examiner* — Gregory A Blankenship
(74) *Attorney, Agent, or Firm* — Hauptman Ham, LLP

(57) ABSTRACT

A pillar for a motor vehicle bodywork is disclosed having a main element with an upper coupling section for attaching to a roof frame, and a secondary element composed of metallic alloy. The secondary element is connected in a planar fashion at least over certain sections of the main element, and the main element has a middle layer composed of a hardened steel alloy, and at least one outer layer which bounds the middle layer toward the outside.

11 Claims, 9 Drawing Sheets

(56) References Cited

U.S. PATENT DOCUMENTS

| | | | | |
|---|---|---|---|---|
| 2016/0355214 A1* | 12/2016 | Irie | .................... | B62D 21/157 |
| 2017/0305470 A1* | 10/2017 | Sato | ..................... | B62D 27/02 |
| 2017/0349216 A1* | 12/2017 | Akhlaque-<br>E-Rasul | ............ | B62D 21/157 |

* cited by examiner

PILLAR FOR A MOTOR VEHICLE AND METHOD FOR MANUFACTURING A PILLAR

RELATED APPLICATIONS

The present application claims the priority from German Application Number 10 2016 114 062.7, filed Jul. 29, 2016, the disclosure of which is hereby incorporated by reference herein in its entirety.

BACKGROUND

1. Field of the Invention

The disclosure is related to a pillar for a motor vehicle, and mores specifically, to a center pillar for a passenger car.

2. Description of the Related Art

Vehicle pillars are part of the vehicle bodywork and connect the vehicle roof, in particular the roof frame, to the vehicle floor, usually in the form of a sill. Vehicle pillars are as a rule manufactured from sheet-metal material with a monocoque construction and serve, as a structural component of the vehicle bodywork, for protecting the vehicle occupants, but also make a substantial contribution to the overall stiffness of the motor vehicle. In particular the center pillar serves to provide side impact protection and prevents another party in an accident or an object from penetrating too far into the passenger compartment of the vehicle. In addition, the side doors are fixed in position at the center pillar by hinges or locks.

In the last 20 years, more and more pillars composed of a steel alloy have been manufactured by form-hardening with extremely high strength properties, as a result of which it has been possible to reduce the wall thickness significantly compared to high-strength cold-formed steels and therefore to save weight. In this context, a non-shaped sheet-metal material composed of a hardenable steel alloy or a pre-shaped sheet-metal material is heated to above the austenitizing temperature of the steel alloy and re-shaped and form-hardened in a cooled press forming tool to form the motor vehicle component.

EP 1 180 470 A1 discloses a form-hardened pillar in the form of a center pillar, also referred to as B pillar. The latter has an upper longitudinal section with an upper coupling section for attachment to a roof frame, and a central longitudinal section which is embodied in the form of a hat profile in cross section. A lower coupling section for attachment to a sill has a lower tensile strength as a predefined deformation point, which is achieved by heating, reduced in the lower coupling section, to less than the austenitizing temperature. In this way, sufficiently defined deformation behavior for protecting the vehicle occupant on the side of the side impact event is to be ensured. In particular, deformation in the region of the upper body of the vehicle occupant is to be prevented in this way by bending or folding in the center of the pillar. A disadvantage with the known component design is that a specific heating process has to be carried out before the form-hardening or alternatively after the form-hardening in order to ensure targeted deformation, and in addition, owing to the relatively soft predefined deformation region, the wall thickness can be reduced only to a limited degree, which holds potential for further lightweight design optimization.

DE 100 49 660 B4 discloses a form-hardened shell part for a hollow carrier of a vehicle bodywork. The shell part is composed of a basic piece of sheet metal and of a relatively small, locally arranged reinforcement piece of sheet metal connected thereto, and is heated for the purpose of austenitization. Subsequently, common re-shaping and form-hardening are carried out in a cooled press forming tool. In this way, allowance is to be made better for the lightweight design, but further improvements are to be aimed at with respect to the corrosion behavior between the pieces of sheet metal and with regard to the deformation behavior.

SUMMARY

The object is to specify, on the basis of the specified prior art, a pillar for a motor vehicle with improved lightweight design properties and service life as well as a more robust method for manufacturing same.

According to one exemplary embodiment, a pillar for a motor vehicle body work includes a main element, in particular composed of a sheet-metal material, with an upper coupling section for attaching to a roof frame, and a secondary element composed of a metallic alloy, wherein the secondary element is connected in a planar fashion at least over certain sections to the main element, and the main element has in cross section a middle layer composed of a hardened steel alloy and at least one outer layer which bounds the middle layer toward the outside, wherein either the main element has a lower coupling section for attachment to a sill of the motor vehicle bodywork or a lower coupling section for attachment to a sill of the motor vehicle bodywork is formed by the secondary element, wherein the pillar also has a central longitudinal section which extends between the coupling sections. According to the invention, the outer layer of the main element is composed of a ferritic stainless steel alloy, wherein the outer layer is connected to the middle layer in a planar and materially joined fashion, wherein the main element has a bending angle greater than 70 degrees and a tensile strength of at least 1350 megapascal.

The bending angle can be acquired in a plate bending test in accordance with the standard VDA 238-100:2010 of the German Association of the Automotive Industry VDA, to the content of which reference is made hereby. The bending angle is thickness-dependent in the case of the pillar according to the invention; given a wall thickness of the main element between 1.0 and 1.5 millimeters (mm) it is, for example, greater than 80 degrees, given a wall thickness between 1.6 and 2.0 mm it is preferably greater than 75 degrees, and given a wall thickness between 2.1 and approximately 3 mm it is greater than 70 degrees.

The bending angle of greater than 70 degrees brings about an extreme deformation behavior on the part of the main element of the pillar in the event of a side impact, as a result of which the pillar is prevented from tearing. Compared to other hardened, in particular form-hardened components with a similar tensile strength, it is possible according to the invention to dispense both with locally different heating or locally different cooling of the tools during the form-hardening and with subsequent heat treatment for softening the completely hardened motor vehicle component. The tensile strength can therefore also be made homogeneous above 1350 MPa, with the result that the wall thickness of the main element can be reduced to a maximum extent. Within the scope of the invention, the main element is therefore hardened homogeneously in all the surface sections, with a tensile strength of at least 1350 MPa, and has, with the exception of softer zones which are unavoidable in terms of joining technology, no unhardened or incompletely hardened sections.

These unavoidable zones can be zones affected by heat as a result of thermal joining methods such as spot welding or plug welding but also trimming edges or edges of holes caused by laser beams. The advantage of the invention is that selective adaptation to the loading of the pillar can be carried out by the secondary element, both when viewed in cross section with respect to the position of the secondary element on the main element and also with respect to the position of the secondary element over the entire length of the pillar or the height thereof in the installed state. This advantage applies, in particular, with respect to the use of flexibly rolled strip stock, referred to as tailored rolled blanks.

According to one exemplary embodiment, suitable steel alloys for the middle layer of the main element are boron steels with the main alloy elements of carbon and manganese, for example 22MnB5, 38MnB5.

In the scope of the invention, the tensile strength in the main element is at maximum 2200 MPa, wherein this limit arises in particular from the currently available and processible alloy composition of the hardenable steel alloys.

In particular, the pillar is a center pillar which, in addition to the main element and secondary element, also comprises a closing panel, by which a cavity is bounded, at least in cross section in the central longitudinal section. The closing panel is particularly advantageously connected to the main element by welding spots.

According to one exemplary embodiment, there is provision that the outer layer of the main element is composed of a ferritic stainless steel alloy, wherein the outer layer is connected to the middle layer in a planar and materially joined fashion. Two outer layers are preferably connected to the middle layer. In this context, the outer layers and the middle layer are already connected before the shaping in the form of a strip, for example by common hot rolling to form a sheet-metal material. By virtue of the reduced carbon content of the ferritic stainless steel alloy, the outer layer brings about a significantly increased bending angle of the sheet-metal material or of the main element in the form-hardened state and additionally outstanding resistance to corrosion, even to crevice corrosion and contact corrosion. Furthermore, with respect to usable ferritic stainless steel alloys reference is made hereby to the content of EN 10088-1 with chrome content values between 10.5 and 30% by weight depending on the type. In order to ensure the weldability, stabilizing additives are used of less than 0.5% by weight of titanium, niobium and/or zircon, as well as the carbon content which is limited to 0.16% by weight. The content by mass of carbon in the outer layer is preferably between 0.03 and 0.16% by weight, wherein the outer layer has in each case a thickness between 40 μm and 400 μm, in particular between 80 and 250 μm.

There can be provision that the central longitudinal section is formed with a U-shaped profile in cross section. As a result, on the one hand, a main element which runs continuously from the roof to the vehicle floor is provided, and on the other hand the cross section, with a U-shaped profile, of the central longitudinal section of the main element serves to make available a maximum flexural strength. The cross section in the central longitudinal section can also be formed with a hat-shaped profile, instead of a U-shaped profile.

The secondary element is advantageously connected to the main element in the central longitudinal section at an inner side of the main element to form a double-sheet layer. As a result, the central longitudinal section can be reinforced further, in particular in conjunction with a cross section with a U-shaped profile, without having to make the wall thickness of other sections of the main element into which fewer bending loads are introduced in the installed state unnecessarily thick or heavy.

As an alternative or in addition to a main element which extends continuously in one piece from the roof to the sill, it is also possible for the secondary element of the pillar to form a lower coupling section for attachment to a sill. It is preferred here that the secondary element comprises, instead of the main element, a lower coupling section, and that, when viewed in the installed state, the main element is therefore formed in such a way that it ends above the sill, in particular above the lower coupling section. As a result, selective deformation is achieved in the lower region of the pillar in the event of a side impact.

In this context, it has proven advantageous that the secondary element is connected to the main element in the central longitudinal section at an outer side of the main element to form a double-sheet layer. Within the scope of the invention, the double-sheet layer should not be confused with the main element or the sheet-metal material of the main element which, according to the invention, is itself formed with multiple layers, but as a single piece of sheet-metal material in the form of a rolled sheet-metal strip or a sheet-metal plate cut to size therefrom. Instead, the double-sheet layer relates to a portion in which two different sheet-metal plates or shaped components are connected to one another in such a way that they bear on one another in a planar fashion.

It is also possible that the main element has a length which corresponds to only approximately 50 to 75 percent of the total length L of the pillar. In particular, when considered in the installation position, the main element does not extend downward to the lower coupling section of the secondary element. Instead, the main element ends in the central longitudinal section. The secondary element also extends over a longitudinal section of less than 75% of the total length of the pillar in the longitudinal direction thereof.

Furthermore, it is possible that at least the main element has a middle layer with a martensitic material structure and a mass fraction of carbon between 0.19 and 0.41% by weight. Preferably, at least the main element of the pillar is form-hardened and has, in particular, a tensile strength of at least 1750 MPa. As a result of the simultaneously ensured bending angle of more than 70 degrees, it is possible in this way to manufacture an even more lightweight and thinner walled component. It has proven advantageous here to use a hardenable steel alloy which comprises, in addition to impurities owing to melting and iron, the following components in percent by weight:

| | |
|---|---|
| Carbon | 0.35 to 0.41 |
| Silicon | 0.1 to 1.0 |
| Manganese | 1.0 to 1.5 |
| Phosphorus | <0.04 |
| Sulfur | <0.02 |
| Aluminum | <0.10 |
| Chromium | <0.35 |
| Titanium | <0.050 |
| Boron | 0.0010 to 0.0055. |

The secondary element can, according to the invention, also have a middle layer composed of a hardened steel alloy and at least one outer layer which bounds the middle layer of the secondary element toward the outside and is composed of a ferritic stainless steel alloy, wherein in this case the outer layer is connected to the middle layer in a planar and materially joined fashion. This has the advantage that the secondary element is also protected against corrosion, can be heated without scale during form-hardening and at the same time has superior mechanical characteristic values which help to give the pillar maximum flexural strength and crash performance.

A bending angle which is in the secondary element also greater than 70 degrees, in particular in combination with a main element which is already formed in such a way that it ends above the lower coupling section, ensures that the pillar is selectively deformed in the secondary element above the sill without the risk of fractures, thereby dissipating impact energy.

Furthermore, there can be provision that the secondary element has a web with a wall thickness and two limbs which each protrude from the web in the same direction and have a wall thickness, wherein in each case a bending region is formed between the web and the limbs.

In this context there can be provision that the bending region has a wall thickness which is greater than the wall thickness of the limb and/or greater than the wall thickness of the web. Such a tailored cross-sectional profile of the secondary element can be manufactured by one of the following methods: flexible rolling of strip material, flexible stretching/drawing, in particular deep drawing of sheet-metal material (tailored formed blanks) or extruding of a lightweight metal profile with various wall thicknesses (tailored extruded blanks). The wall thickness of the bending region of the secondary element preferably makes up 1.3 to 2 times the wall thickness of the web and/or the wall thickness of the limbs here.

In addition, it may be useful that the secondary element bears on the main element in a planar fashion, in particular over the entire surface, and is connected, in particular, to the main element by thermal joining. The connection is particularly preferably formed by a plurality of welding spots. At least the limbs of the main element and secondary element are connected by this means. Alternatively, the web of the main element and secondary element can also be joined thermally.

In one development of the invention, the secondary element is already connected to the main element by joining before common re-shaping, with the result that common heating and re-shaping can take place. In the case of form-hardening, forming tool faces which are adapted to the contour of the two connected elements are to be provided, said faces permitting homogeneous cooling through sufficient tool contact.

A further aspect of the invention relates to a method for manufacturing a pillar according to one of the preceding claims.

The method is characterized by the following steps:
making available a main element, in particular composed of a sheet-metal material, with a middle layer composed of a hardenable steel alloy and at least one outer layer composed of a ferritic stainless steel alloy, wherein the outer layer is connected to the middle layer in a planar and materially joined fashion,
making available a secondary element composed of a metallic alloy,
optional pre-shaping of the main element and/or of the secondary element,
connecting the main element and secondary element in a planar fashion at least over certain sections by thermal joining,
complete heating for the purpose of austenitizing at least the main element to higher than 900° C.,
re-shaping the heated main element and the secondary element, in particular together in a press forming tool,
form-hardening at least the main element in the press forming tool, wherein during the form-hardening the main element of the pillar is cooled from a temperature higher than 850° C. to a temperature lower than 250° C. with a cooling rate of greater than 27 kelvin per second, as a result of which a bending angle of greater than 70 degrees and a tensile strength of at least 1350 megapascal are set in the main element.

As a result of the cooling rate which, in the specified temperature range, is on average at least 27 K/s, preferably at least 40 K/s, and most preferably between 50 and 150 K/s, sufficient hardening of the steel alloy of the main element is brought about but at the same time a surprisingly large bending angle is achieved. For this strength class of form-hardened components, otherwise usually necessary costly process steps which are susceptible to faults, such as locally different heating or cooling or even subsequent annealing, for example in order to achieve coupling sections which are not susceptible to fracturing, or a specific deformation behavior in the installed state of the pillar according to the invention are avoided owing to the bending angle of greater than 70 degrees.

As already explained above, the pillar has, essentially over the entire surface, the mechanical properties of the tensile strength of at least 1350 MPa and of the bending angle of greater than 70 degrees. The method according to the invention specifies an optimum, simple process for manufacturing pillars for the bodywork of a motor vehicle with improved crash performance and reduced weight. A particular advantage compared to pillars which are to a certain extent differently form-hardened or locally softened is that the component does not have any thermally conditioned warping, rebound effects or internal stresses, does not have to be protected against the formation of scales and oxidation when heating and form-hardening, and costly pre-treatment or post-treatment to apply corrosion protection can be dispensed with.

BRIEF DESCRIPTION OF THE DRAWINGS

For an understanding of embodiments of the disclosure, reference is now made to the following description taken in conjunction with the accompanying drawings, in which.

In the figures, the same reference signs are used for identical or similar components, even if a repeated description is omitted for reasons of simplicity.

DETAILED DESCRIPTION OF SOME EMBODIMENTS

Some embodiments will be now described with reference to the Figures.

Figure 1:
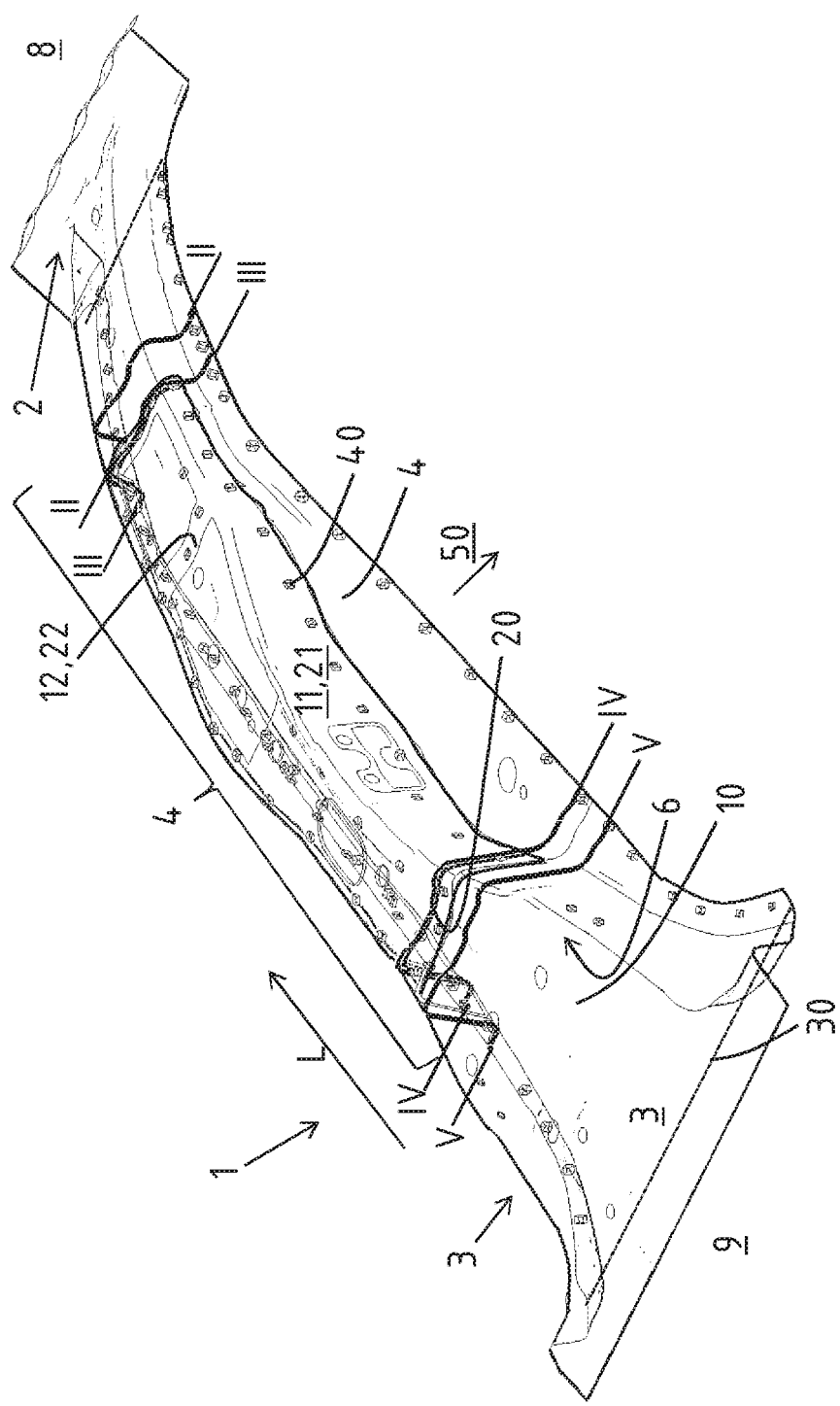
FIG. 1 shows a pillar in accordance with one exemplary embodiment.

FIG. 1 shows a first embodiment variant of the pillar 1 according to the invention. In the installation position, the pillar 1 extends from a sill (not shown) of a vehicle bodywork to a roof frame (not illustrated). The pillar 1 has an upper coupling section 2 at the roof-side end 8 and a lower coupling section 3 at the sill-side end 9 shown at the bottom in the plane of the figure. A central longitudinal section 4, which is formed with a U-shaped or hat-shaped cross section, extends between the coupling sections 2, 3.

The pillar 1 comprises a main element 10, in particular composed of a sheet-metal material, and a secondary element 20, wherein the secondary element 20 is connected here essentially over the entire surface to the main element 10. The connection is preferably made by thermal joining, wherein welding spots 40 are illustrated here between two limbs 11 of the main element 10 and two limbs 21 of the secondary element 20. The limbs 11, 21 are each connected by a web 12, 22 and form therewith in cross section a U-shaped profile at least in the central longitudinal section 4 of the main element 10. For this purpose, the limbs 11 are each formed protruding from the web 12 in the same direction, specifically in the installation position in the direction of a passenger compartment 50 of the motor vehicle.

It is apparent that the main element 10 has a lower coupling section 3 for attachment to the sill of the vehicle bodywork, and consequently that the lower coupling section 3 is an integral component of the main element 10.

Figure 4:
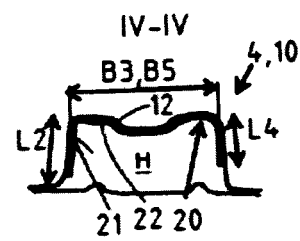

The cross section of the pillar 1 becomes continuously larger from the upper coupling section 2 to the lower coupling section 3, on the one hand with increasingly larger length L2 or L4 of the limbs 11 of the main element 10 or of the limbs 21 of the secondary element 20, and on the other hand with increasingly larger width B3 or B5 of the web 12 of the main element 10 or of the web 22 of the secondary element 20 (as shown in FIG. 4).

The main element 10 is closed off by a closing panel 30 (indicated by dashed lines) at least in the central longitudinal section 4 to form a cavity H.

The main element 10 has a tensile strength Rm of at least 1350 MPa and a bending angle α of greater than 70 degrees. These mechanical characteristic values are formed homogeneously over the entire surface of the main element 10, even if welding spots 40 or welding seams and softened portions, which have a small area and which are unavoidable in terms of welding technology, and thermally tailored edges remain unaffected by this.

The secondary element 20 is composed of a metal alloy, preferably also of a hardened steel alloy with comparable mechanical properties and is attached on the inner side 6 of the main element 10 directed toward the closing panel 30. With respect to the installation position of the pillar 1 in the vehicle bodywork, the closing panel 30 faces the passenger compartment 50 of the motor vehicle.

Figure 2:
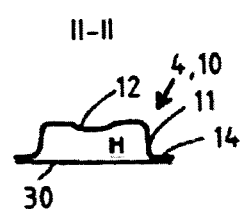
FIGS. 2 to 5 show different cross sections through the pillar shown in FIG. 1.

FIGS. 2 to 5 show cross-sectional illustrations of the first embodiment variant, which cross sections have been formed at different locations over the entire length L of the pillar 1. FIG. 2 shows the cross section II-II from FIG. 1 in the central longitudinal section 4 near to the upper coupling section 2 with respect to the roof frame. It is clearly apparent that the main element 10 has a web 12 and limbs 11 which each protrude from the web 12 in the same direction, wherein flanges 14, which also serve for connection to the closing panel 30, adjoin the limbs 11.

Figure 3:
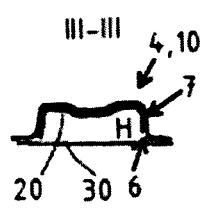

In contrast to the cross section in FIG. 2, FIG. 3 shows, in the section III-III from FIG. 1, the secondary element 20 which is in contact in a planar fashion with the main element 10 and connected thereto.

Figure 5:
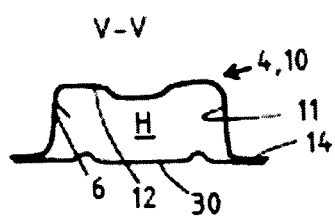

FIGS. 4 and 5 have been derived from further down in the installation position with respect to the sections IV-IV and V-V from FIG. 1. In FIG. 4, the secondary element 20 is also connected to the central longitudinal section 4 of the main element 10. Only slightly further down in the installation position, it is apparent according to FIG. 5 that the secondary element 20 no longer bears against the main element 10, since the secondary element 20 does not extend below by approximately one third of the total length L of the pillar 1. The lower coupling section 3 is consequently formed only by the main element 10 and not reinforced by the secondary element 20. As a result, a good deformation behavior and a saving in weight are achieved compared to a secondary element 20 which extends continuously downward.

Figure 6:
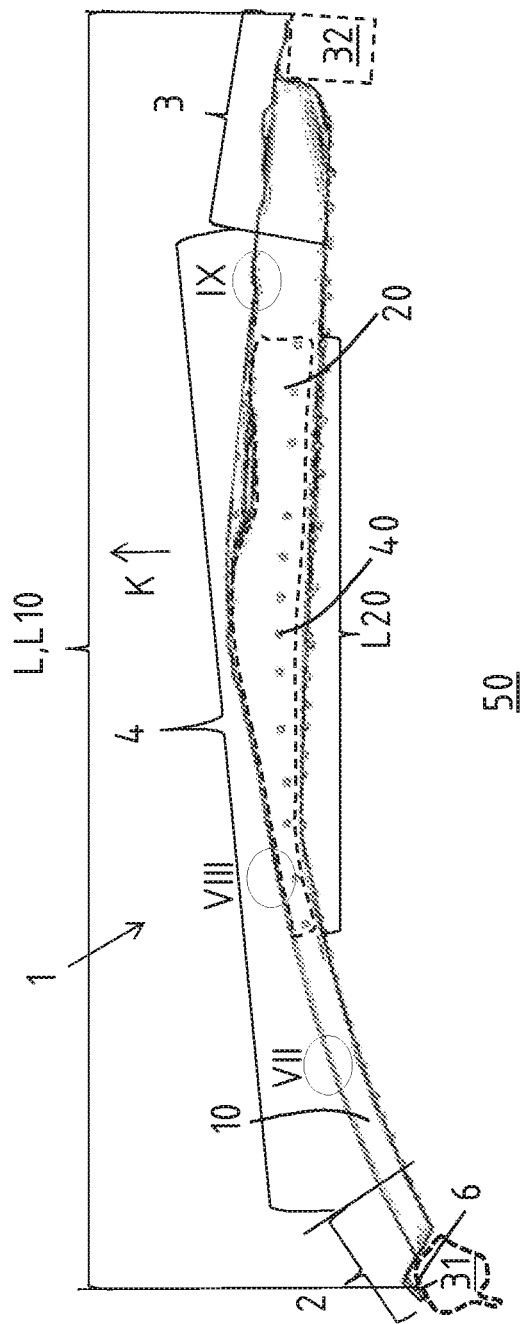
FIG. 6 shows a side view of the pillar shown in FIG. 1.
Figure 9:
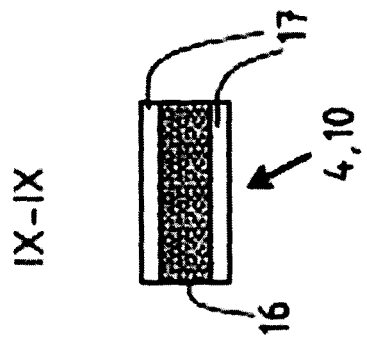
FIGS. 7 to 9 show various enlargements of a longitudinal section of the pillar shown in FIG. 1.
Figure 8:
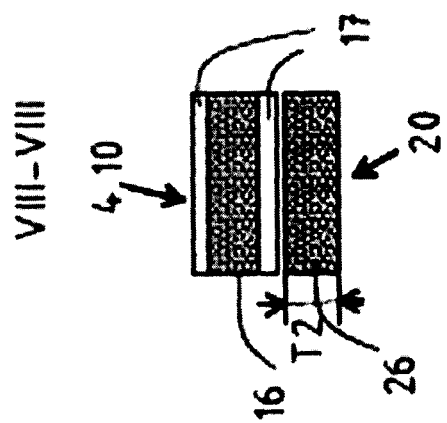
Figure 7:
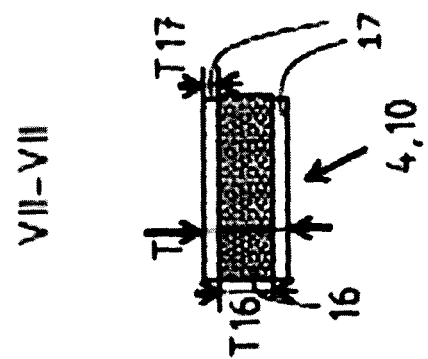

FIG. 6 shows the first embodiment variant of the pillar 1 according to the invention from FIG. 1 in a side view. In contrast to the installation position in the motor vehicle, the pillar 1 in FIG. 6 is shown rotated through 90 degrees. The main element 10 of the pillar 1 is shown, comprising an upper coupling section 2 and a lower coupling section 3 as well as a central longitudinal section 4 extending between them. A secondary element 20 with a length L20 extends over only part of the total length L of the pillar 1. In this embodiment variant, the length L20 of the secondary element corresponds to the total length L of the pillar 1 by approximately 35 to 65 percent. In the central longitudinal section 4, the secondary element 20 which rests on the inner side 6 is arranged shown by dashed lines and is connected to the main element 10 via welding spots 40. The pillar has a curvature K away from the vehicle bodywork. The upper coupling section 2 is formed adapted to the contour of a roof frame 31 (illustrated by dashed lines) and is joined at the inner side 6 to the roof frame 31. The lower coupling section 3 is formed adapted to the contour of a sill 32 (indicated by dashed lines) and is joined at an inner side 6 to the sill 32. Three longitudinal sections over the entire length L of the pillar 1 are shown in FIGS. 7 to 9. The sections VII to IX form the basis for FIGS. 7 to 9.

The section according to FIG. 7 shows the sheet-metal material of a part of the central longitudinal section 4 of the pillar 1 which is located on the left-hand side in the plane of the figure (high up in the installation position) and which is not yet reinforced by the secondary element 20. A middle layer 16 with a martensitic material structure and a mass fraction of carbon between 0.20 and 0.40 percent by weight is shown, as well as two outer layers 17, bounding the middle layer 16 toward the outside, with a mass fraction of carbon which is at least 10% lower than the mass fraction of the carbon of the middle layer 16. The outer layers 17 of the main element 10 are composed of a ferritic stainless steel alloy, wherein the outer layers 17 are connected to the middle layer 16 in a planar and materially joined fashion.

The section according to FIG. 8 shows a part of the central longitudinal section 4 located further down in the installation position, where the secondary element 20 is arranged on the central longitudinal section 4 of the main element 10. The secondary element is connected by thermal joining to the main element 10 in such a way that it bears in a planar fashion.

FIG. 9 shows a section through a part of the central longitudinal section 4 which is located still further down, wherein it is apparent that the main element 10 is no longer in contact with or reinforced by the secondary element 20.

Figure 10:
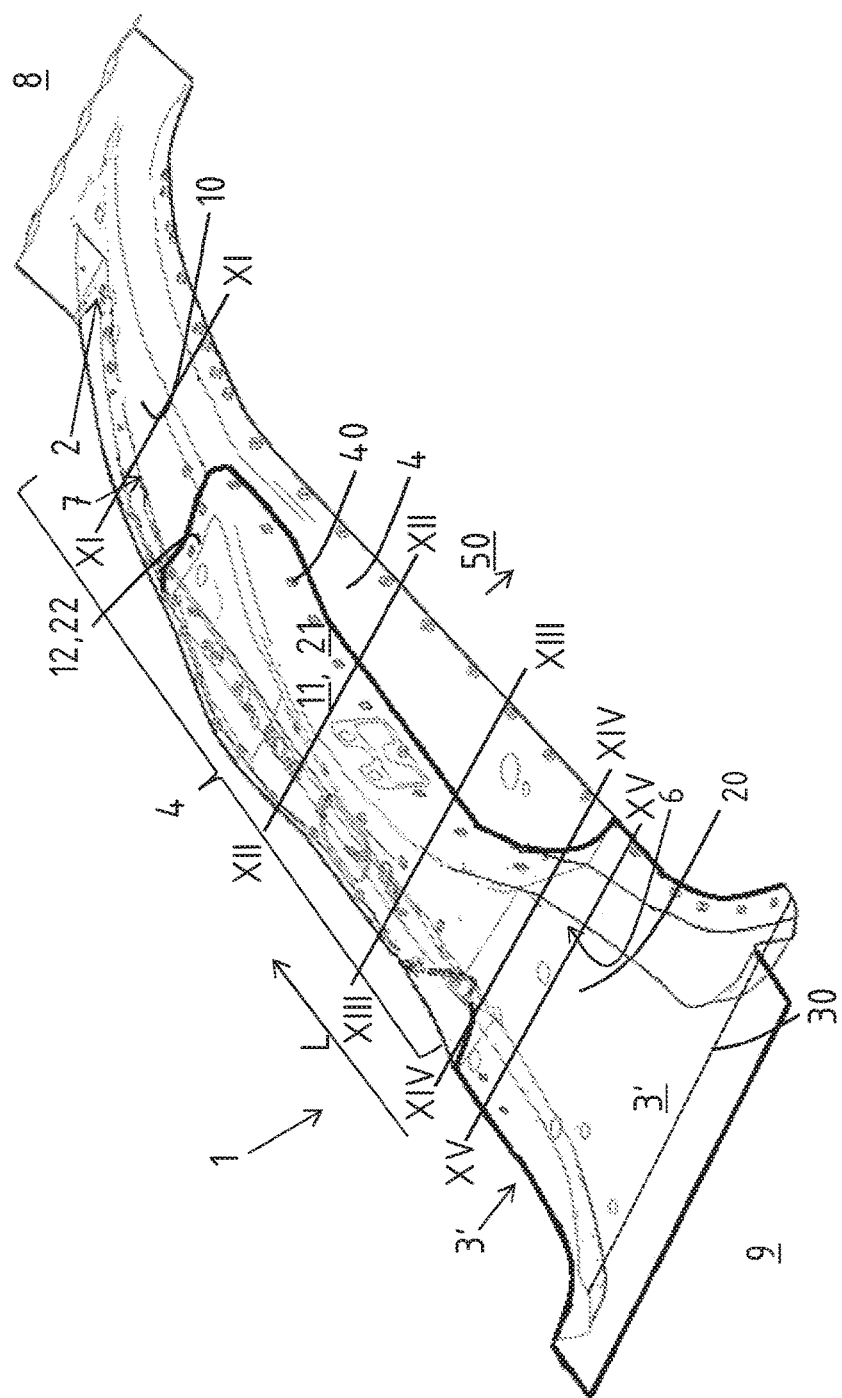
FIG. 10 shows a pillar in accordance with a second exemplary embodiment.

FIG. 10 shows a second embodiment variant of the pillar 1 according to the invention. The pillar 1 extends in the installation position from a sill of a vehicle bodywork to a roof frame. The pillar 1 has a main element 10 with an upper coupling section 2 arranged at the roof-side end 8, and a secondary element 20 which extends downward in the plane of the figure, in the direction of a sill-side end 9, and a lower coupling section 3'. A central longitudinal section 4 of the main element 10, which is formed with a U-shaped or hat-shaped cross section, extends between the coupling sections 2, 3'.

The pillar 1 comprises a main element 10, in particular composed of a sheet-metal material, and a secondary element 20, wherein the secondary element 20 is connected here essentially over the entire surface to the main element 10 in the central longitudinal section 4. The connection is preferably made by thermal joining, wherein welding spots 40 are illustrated here between two limbs 11 of the main element and two limbs 21 of the secondary element 20. The limbs are each connected by a web 12, 22 and form in cross section a U-shaped profile, at least in the central longitudinal section 4 of the main element 10. For this purpose, the limbs 11 are each formed protruding from the web 12 in the same direction, specifically in the installation position in the direction of a passenger compartment 50 of the motor vehicle.

It is apparent that, in contrast to the first embodiment variant, it is not the main element 10 but rather the secondary element 20 which has a lower coupling section 3' for attachment to the sill of the vehicle bodywork, and consequently that the lower coupling section 3' is an integral component of the secondary element 20.

The cross section of the pillar 1 becomes continuously larger from the upper coupling section 2 to the lower coupling section 3', on the one hand with increasingly larger length L2 or L4 of the limbs 11 of the main element 10 or of the limbs 21 of the secondary element 20, and on the other hand with increasingly larger width B3 or B5 of the web 12 of the main element 10 or of the web 22 of the secondary element 20.

The secondary element 20 and the main element 10 are closed off, at least in the central longitudinal section 4, by a closing panel 30 (indicated by dashed lines) to form a cavity H (FIGS. 11 to 15).

The main element 10 has a tensile strength Rm of at least 1350 MPa and a bending angle α of greater than 70 degrees. These mechanical characteristic values are formed homogeneously over the entire surface of the main element 10, even if welding spots 40 or welding seams and softened portions which are unavoidable in terms of welding technology and have a small area remain unaffected by this.

In this embodiment variant, the secondary element 20 is also composed, at least in a middle layer 26, of a hardened steel alloy with comparable mechanical properties, and is attached on the outer side 7, facing away from the closing panel 30, of the main element 10. With respect to the installation position of the pillar 1 in the vehicle bodywork, the closing panel 30 faces the passenger compartment 50 of the motor vehicle.

Figure 11:
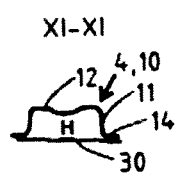
FIGS. 11 to 15 show various cross sections through the pillar shown in FIG. 10.

FIGS. 11 to 15 show cross-sectional illustrations of the second embodiment variant according to the sections XI to XV in FIG. 10, which cross sections have been formed at different locations over the length L of the pillar 1. FIG. 11 illustrates the cross section in the central longitudinal section 4 near to the upper coupling section 2 with respect to the roof frame. It is clearly apparent that the main element 10 has a web 12 and two limbs 11 which each protrude from the web 12 in the same direction, wherein flanges 14, which also serve for connection to the closing panel 30, adjoin the limbs 11.

Figure 12:
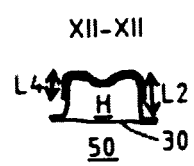
Figure 13:
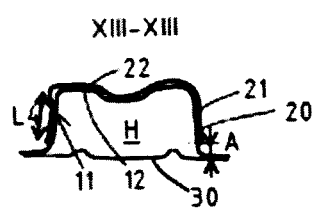

In contrast to the cross section in FIG. 12, in FIG. 13 the secondary element 20 can be seen, said secondary element 20 bearing in a planar fashion from an outer side 7 on the main element 10 and being connected thereto.

Figure 14:
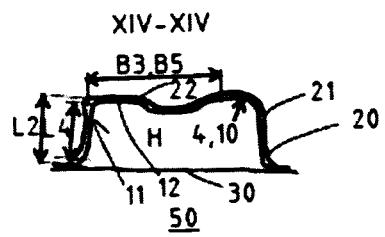
Figure 15:
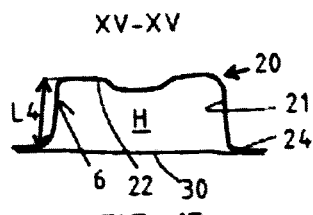

The cross sections according to FIGS. 14 and 15 have been derived from further down in the installation position. In FIG. 14, the secondary element 20 is also connected to the central longitudinal section 4 of the main element 10. Only a little further down in the installation position, it is apparent according to FIG. 15 that the secondary element 20 no longer bears on the main element 10. The lower coupling section 3 is formed only by the secondary element 20. In FIGS. 12 to 14 it is also apparent that the limbs of the secondary element 20 have a shorter length L4 than the length L2 of the limbs 11 of the main element 10, with the result that, in this higher position when viewed in the installation position, the secondary element 20 is at a distance A from the closing panel 30 (see FIG. 13), which distance becomes smaller in the direction of the sill-side end 9. This distance is equal to zero in FIG. 15, with the result that the flange 24 of the secondary element 20 is in direct contact with the closing panel 30.

Figure 16:
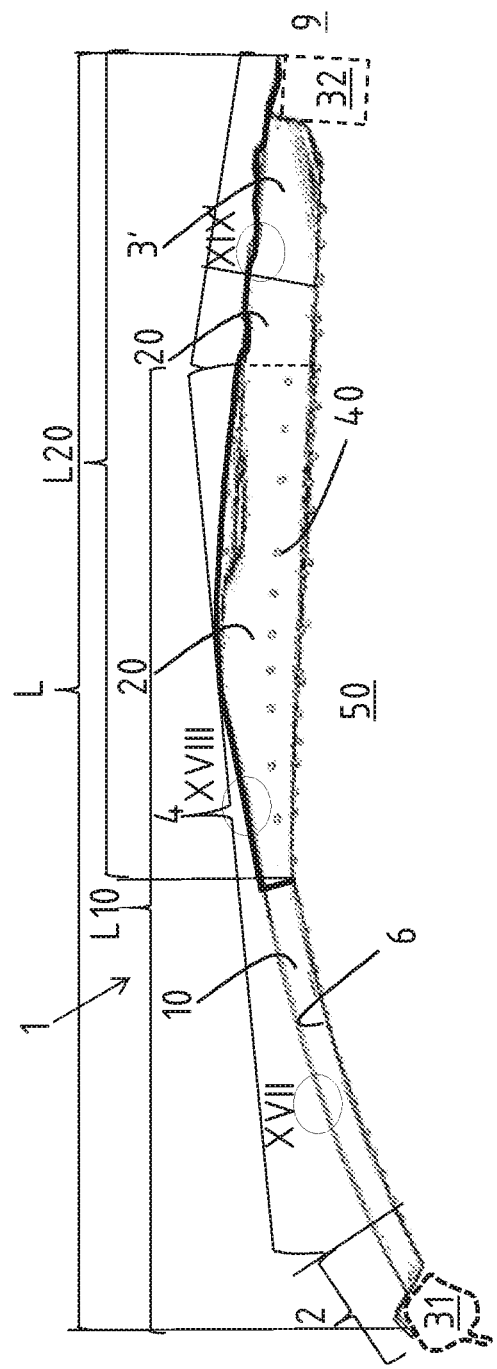
FIG. 16 shows a side view of the pillar shown in FIG. 10.

FIG. 16 shows the second embodiment variant of the pillar 1 according to the invention from FIG. 10 in a side view. In contrast to the installation position in the motor vehicle, the pillar 1 in FIG. 16 is shown rotated through 90 degrees. The main element 10 of the pillar 1 is shown, comprising an upper coupling section 2 and a central longitudinal section 4 running in the direction of the sill-side end 9. In this embodiment variant, the length L20 of the secondary element 20 corresponds to the total length L of the pillar 1 by approximately 50 to 75%. The length L10 of the main element 10 also corresponds to the total length L of the pillar 1 by only approximately 50 to 75%, wherein the main element 10 does not extend over the lower coupling section 3' of the secondary element 20.

In the central longitudinal section 4, shown by dashed lines, a secondary element 20 is arranged which rests on the outer side 7 and is joined to the main element 10 via welding spots 40. The secondary element 20 comprises a lower coupling section 3 for attachment to a sill 32 of the motor vehicle bodywork.

The upper coupling section 2 is formed adapted to the contour of a roof frame 31 (illustrated by dashed lines) and is joined at an inner side 6 to the roof frame 31. The lower coupling section 3 of the secondary element 20 is formed adapted to the contour of a sill 32 (indicated by dashed lines) and is joined at an inner side 6 to the sill 32. Three longitudinal sections XVII, XVIII and XIX from FIG. 16 are shown in FIGS. 17 to 19 over the entire length L of the pillar 1.

Figure 17:
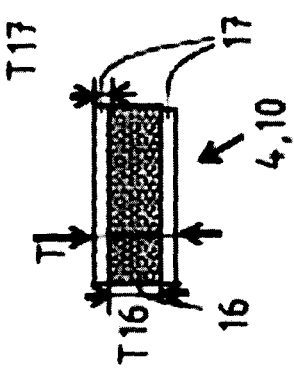

The section according to FIG. 17 shows the sheet-metal material of a part of the central longitudinal section 4 of the pillar 1 which is located on the left-hand side in the plane of the figure (high up in the installation position) and which is not yet reinforced with the secondary element 20. It is possible to see a middle layer 16 with a martensitic material structure and a mass fraction of carbon between 0.20 and 0.40% by weight and two outer layers 17 which bound the middle layer 16 toward the outside and have a mass fraction of carbon which is at least 10% lower than the mass fraction of the carbon of the middle layer 16. The outer layers 17 of the main element 10 are composed of a ferritic stainless steel alloy, wherein the outer layers 17 are connected to the middle layer 16 in a planar and materially joined fashion.

Figure 18:
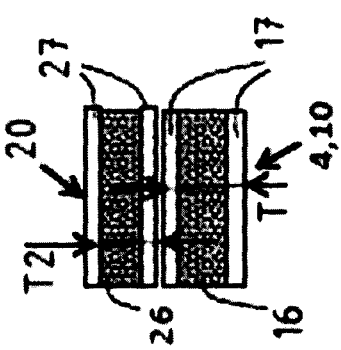

The section according to FIG. 18 shows a part of the central longitudinal section 4 which is located further down in the installation position, where the secondary element 20 is arranged on the central longitudinal section 4 of the main element 10. The secondary element 20 is connected to the main element 10 by thermal joining, in particular by means of welding spots 40, so as to bear in a planar fashion. The wall thickness T2 of the secondary element 20 is preferably smaller than the wall thickness T of the main element 10, since in the lower part of the pillar 1, in particular in the lower coupling section 3', less flexural strength is required than in the central longitudinal section 4 which is partially formed with a double layer.

Figure 19:
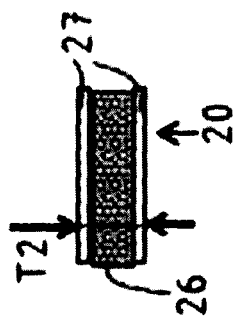
FIGS. 17 to 19 show various enlargements of a longitudinal section of the pillar shown in FIG. 10; and,
FIG. 20 shows a secondary element of the pillar in accordance with an exemplary embodiment.

FIG. 19 shows a section XIX through a part of the pillar 1 which is located still further down in the installation position, wherein it is apparent that the main element 10 has ended and the secondary element 20 and the main element 10 are no longer bearing.

Figure 20:
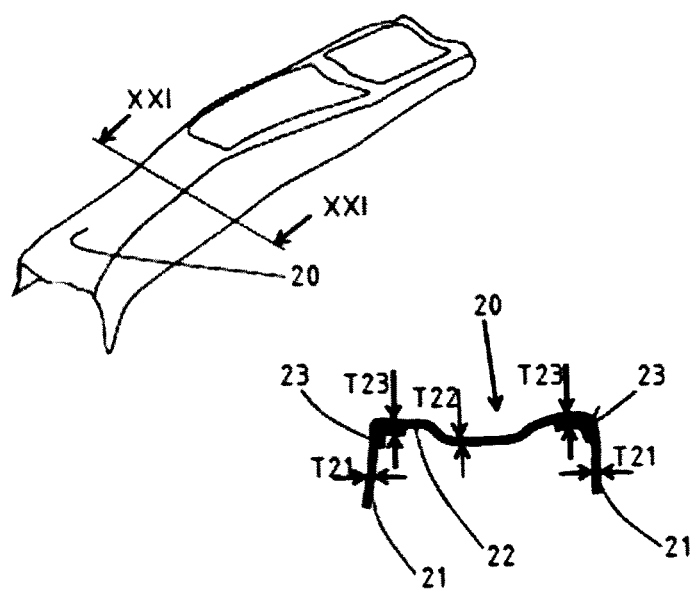

FIG. 20 shows a secondary element 20 of the pillar 1 according to the invention in an isometric view and in cross section. It is apparent that in each case a bending region 23 is formed between the limb 21 and the web 22, which bending region 23 has a wall thickness T23 which is greater compared to the wall thickness T21 of the limb 21 and/or the wall thickness T22 of the web 22. Therefore, a component design which is particularly suitable for loading and has maximum flexural strength in the reinforced central longitudinal section 4 of the pillar 1 is possible. A secondary element 20 of this kind can preferably be combined with the first embodiment variant.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A pillar for a motor vehicle bodywork, comprising:
a main element with an upper coupling section for attaching to a roof frame, and a secondary element composed of a metallic alloy, wherein the secondary element is connected in a planar fashion at least over certain sections to the main element, and the main element has in cross section a middle layer composed of a hardened steel alloy and at least one outer layer which bounds the middle layer toward the outside,
wherein either the main element has a lower coupling section for attachment to a sill of the motor vehicle bodywork or a lower coupling section for attachment to a sill of the motor vehicle bodywork is formed by the secondary element,
wherein the pillar also has a central longitudinal section which extends between the coupling sections, characterized in that the outer layer of the main element is composed of a ferritic stainless steel alloy, wherein the outer layer is connected to the middle layer in a planar and materially joined fashion, and the main element has a bending angle ($\alpha$) greater than 70 degrees and a tensile strength (Rm) of at least 1350 megapascal.

2. The pillar according to claim 1, wherein the central longitudinal section is formed with a U-shaped profile in cross section.

3. The pillar according to claim 1, wherein the secondary element is connected to the main element in the central longitudinal section at an inner side of the main element to form a double-sheet layer.

4. The pillar according to claim 1, wherein the secondary element is connected to the main element in the central longitudinal section at an outer side of the main element to form a double-sheet layer.

5. The pillar according to claim 4, wherein the main element has a length L10 which corresponds to only approximately 50 to 75percent of the total length L of the pillar 1, and wherein the main element does not extend as far as the lower coupling section of the secondary element.

6. The pillar according to claim 1, wherein at least the main element is form-hardened and has a tensile strength of at least 1750 MPa.

7. The pillar according to claim 1, wherein the secondary element has a middle layer composed of a hardened steel alloy and at least one outer layer which bounds the middle layer of the secondary element toward the outside and is composed of a ferritic stainless steel alloy, wherein the outer layer is connected to the middle layer in a planar and materially joined fashion.

8. The pillar according to claim 1, wherein the secondary element bears on the main element in a planar fashion, in particular over the entire surface, and is connected, in particular, to the main element by thermal joining.

9. The pillar according to claim 1, wherein the secondary element is connected to the main element by joining before common re-shaping.

10. The pillar according to claim 1, wherein the secondary element has a web with a wall thickness T22 and two limbs which each protrude from the web in the same direction and have a wall thickness T21, wherein in each case a bending region is formed between the web and the limbs, wherein the bending region has a wall thickness T23 which is greater than the wall thickness T21 of the limbs and/or greater than the wall thickness T22 of the web.

11. A method for manufacturing a pillar according to claim 1, comprising:
providing a main element with a middle layer composed of a hardenable steel alloy and at least one outer layer composed of a ferritic stainless steel alloy, wherein the outer layer is connected to the middle layer in a planar and materially joined fashion,
providing a secondary element composed of a metallic alloy,
optional pre-shaping of the main element and/or of the secondary element,
connecting the main element and secondary element in a planar fashion at least over certain sections by thermal joining,
complete heating for the purpose of austenitizing at least the main element to higher than 900° C.,
re-shaping the heated main element and the secondary element, in particular together in a press forming tool,
form-hardening at least the main element in the press forming tool, wherein during the form-hardening the main element of the pillar is cooled from a temperature higher than 850° C. to a temperature lower than 250° C.

with a cooling rate of greater than 26 kelvin per second, as a result of which a bending angle (α) of greater than 70 degrees and a tensile strength (Rm) of at least 1350 megapascal are set in the main element.

* * * * *